United States Patent
Medbo et al.

(10) Patent No.: US 9,301,152 B2
(45) Date of Patent: Mar. 29, 2016

(54) REPEATER DEVICE

(75) Inventors: Jonas Medbo, Uppsala (SE); Sven Petersson, Savedalen (SE); Kambiz Zangi, Chapel Hill, NC (US)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 320 days.

(21) Appl. No.: 13/883,055

(22) PCT Filed: Nov. 3, 2010

(86) PCT No.: PCT/EP2010/066762
§ 371 (c)(1),
(2), (4) Date: May 2, 2013

(87) PCT Pub. No.: WO2012/059128
PCT Pub. Date: May 10, 2012

(65) Prior Publication Data
US 2013/0223330 A1    Aug. 29, 2013

(51) Int. Cl.
  *H04W 16/26*  (2009.01)
  *H04B 7/155*  (2006.01)

(52) U.S. Cl.
  CPC .............. *H04W 16/26* (2013.01); *H04B 7/155* (2013.01)

(58) Field of Classification Search
  USPC ........................................................ 370/315
  See application file for complete search history.

(56) References Cited

U.S. PATENT DOCUMENTS

| 7,450,907 B2* | 11/2008 | Shurvinton et al. ........ 455/67.11 |
| 2007/0015462 A1* | 1/2007 | Dean et al. ...................... 455/15 |
| 2012/0270507 A1* | 10/2012 | Qin et al. ........................ 455/73 |

FOREIGN PATENT DOCUMENTS

| CN | 1394016 A | | 1/2003 |
| WO | WO2010/003462 | * | 7/2008 |
| WO | 2010003462 A1 | | 1/2010 |
| WO | 2010117313 A1 | | 10/2010 |

OTHER PUBLICATIONS

Office Action dated May 20, 2015, issued in Chinese Patent Application No. 201080069978.3, 9 pages.

* cited by examiner

*Primary Examiner* — Ian N Moore
*Assistant Examiner* — Mewale Ambaye
(74) *Attorney, Agent, or Firm* — Patents on Demand, P.A.; Brian K. Buchheit; Scott M. Garrett

(57) ABSTRACT

The invention relates to a repeater arrangement for amplifying a communication link between a base station and user equipment, wherein the communication link comprises an uplink and a downlink utilizing frequencies within a coherence bandwidth. The repeater arrangement comprises: a first antenna for communication with the base station; a second antenna for communication with the user equipment; an amplifying device operatively connected to the first antenna and to the second antenna for conveying and amplifying communication signals between the first antenna and the second antenna, the amplifying device comprising a first signal path for the uplink and a second signal path for the downlink, the first and second signal paths having equal electrical length, in order to affect said communication signal identically in both uplink and downlink, providing same phase and amplitude characteristics to said communication signal.

14 Claims, 1 Drawing Sheet

REPEATER DEVICE

CROSS REFERENCE TO RELATED APPLICATION(S)

This application is a 35 U.S.C. §371 National Phase Entry Application from PCT/EP2010/066762, filed Nov. 3, 2010, designating the United States, the disclosure of which is incorporated herein in its entirety by reference.

FIELD OF THE INVENTION

The present invention relates generally to the field of wireless communication, and in particular to arrangements for amplifying signaling between wireless communicating parties.

BACKGROUND OF THE INVENTION

In any wireless communication system, a signal transmitted from one signaling part to another is distorted due to dynamic properties of a radio channel through which it is transmitted. The radio channel between a transmitter and a receiver can be characterized by channel state information describing how the signal propagates from the transmitter to the receiver. The channel state information is estimated at the receiver and conveyed to the transmitter, and used for compensating e.g. for scattering, fading and power level reduction related to distance between the transmitter and receiver.

In a time division duplex (TDD) based communication system, reciprocity between downlink (DL, signaling from base station to user equipment) and uplink (UL, signaling from user equipment to base station) can often be assumed. The channel state information of the user equipment (UE) and the base station may be assumed to be equal, which provides a large advantage in highly reduced signaling and thereby increased system performance.

However, the assumption that the radio channel is reciprocal is not always true. The channel reciprocity is, for example, lost when a conventional one-way repeater is introduced in the communication system. Such repeaters are often desirable in the wireless communication system for overcoming e.g. power level reductions resulting e.g. from large distances. However, due to non-coherent radio paths, used for DL and UL, respectively, there might be both amplitude and phase differences between the two links, introduced by the repeater. The differences can severely affect performance.

For example, in a system in which channel weights in DL, based on UL signals, are designed for constructively adding signal components from different signal paths at the receiving end, the introduction of a repeater may destroy the reciprocity. In particular, signal paths from the base station may be received directly by the user equipment, as well as via the repeater. Amplitude and phase errors result from the false assumption that the channel is reciprocal and that the same channel state information can be used in uplink and downlink. Due to these amplitude and phase errors, the signal components of the different paths may add up less efficiently or even destructively. In short, the repeater introduces phase differences as well as amplitude differences, which is highly detrimental for the system performance.

From the above it is clear that it would be advantageous to be able to benefit from the reciprocity of communication channels to as a large extent as possible, even when a repeater is utilized.

SUMMARY OF THE INVENTION

One aspect of the present invention is directed towards repeater arrangements, wherein the reciprocity of communication channels is maintained.

Another aspect of the present invention is directed towards amplifying devices, maintaining the reciprocity of communication signal.

In accordance with an aspect of the invention, a repeater arrangement is provided for amplifying a communication link between a base station and user equipment. The communication link comprise an uplink and a downlink utilizing frequencies within a coherence bandwidth, and the repeater arrangement comprises: a first antenna for communication with the base station; a second antenna for communication with the user equipment; an amplifying device operatively connected to the first antenna and to the second antenna for conveying and amplifying communication signals between the first antenna and the second antenna. The amplifying device comprises a first signal path for the uplink and a second signal path for the downlink, wherein the first and second signal paths have equal electrical length, in order to affect the communication signal identically in both uplink and downlink, providing same phase and amplitude characteristics to the communication signal. By means of the invention, and in particular by providing, within the repeater arrangement, a signal path for the uplink having an electrical length that is equal to the electrical length of a signal path for the downlink, reciprocity of a communication channel between a user equipment and a base station is obtained. All advantages of reciprocal channels in the communication system are thus maintained even in case of using a repeater.

According to another variation of the invention, the amplifying device comprises: a first switch having a first position in which the first antenna is connected to the first signal path and a second position in which the first antenna is connected to the second path; a second switch having a first position in which the second antenna is connected to the second signal path and a second position in which the second antenna is connected to the first signal path; an amplifier arranged to: amplify the uplink when the first switch is in its first position and the second switch is in its second position, and to amplify the downlink when the first switch is in its second position and the second switch is in its first position; a timing unit for controlling the first and second switches so as to align the first signal path and the second signal path to uplink and downlink transmission, respectively.

In another variation of the invention, the timing unit of the above embodiment comprises a device for decoding a synchronization signal sent from the base station. In this embodiment, e.g. a chip-set conventionally used by user equipment for decoding synchronization signals sent by the base station may be included in the repeater arrangement. A cost-efficient and easily implemented solution is thus provided.

In another variation of the invention, the timing unit comprises a stand-alone unit and has an antenna for reception of synchronization signals from the base station. An alternative to the above implementation of the timing unit is thus provided.

In another variation of the invention, the amplifier of the above embodiment is arranged to be switched on once the timing unit has timing synchronized the repeater arrangement to uplink and downlink transmission. Further, the amplifier gain of the amplifier is arranged to be ramped up so as to maintain reciprocity.

In another variation of the invention, the repeater arrangement comprises an amplifying device that comprises: a first circulator having a first port for connection to the first antenna; a second circulator having a first port for connection to the second antenna; a first amplifier connected at its input to a second port of the first circulator and at its output to a third port of the second circulator; a second amplifier connected at its output to a third port of the first circulator and at its input to a second port of the second circulator. In this embodiment, an alternative solution is provided for obtaining a reciprocal repeater, wherein the use of switches and timing unit is avoided.

In another variation of the above embodiment, a first filter device is included, connected at one end to the first port of the first circulator and at another end to the first antenna; and a second filter device connected at one end to the first port of the second circulator and at another end to the second antenna. By means of such filters, amplifier saturation outside antenna matched frequency band can be avoided.

In another variation of the above embodiment, a first attenuator is provided connected at one end to the first filter device and at one end to the first antenna, and a second attenuator connected at one end to the second filter device and at one end to the second antenna. The gain may thereby be adjusted when reflections are significant.

In another variation of the above embodiment, a control unit may further be provided connected to the first and second attenuators. The control unit comprises a first sensor for sensing a signal as reflected by the second antenna; a second sensor for sensing a signal as reflected by the first antenna; and means for controlling the first and second attenuators in dependence on a signal level sensed by the first sensor and the second sensor.

In another variation of the invention, the amplifying device further comprises calibration means for calibrating the first and second amplifiers to have equal gain and phase characteristics.

The invention also encompasses an amplifying device for operative connection to a first antenna and to a second antenna thereby conveying communication signals between the first antenna and the second antenna. The amplifying device is arranged to amplify a communication link between a base station and user equipment, wherein the communication link comprises an uplink and a downlink utilizing frequencies within a coherence bandwidth. The amplifying device comprises a first signal path for the uplink and a second signal path for the downlink, the first and second signal paths further having equal electrical length in order to affect the communication signal identically in both uplink and downlink, providing same phase and amplitude characteristics to the communication signal.

In a variation of the invention, the amplifying device comprises: a first switch having a first position in which the first antenna is connected to the first signal path and a second position in which the first antenna is connected to the second path; a second switch having a first position in which the second antenna is connected to the second signal path and a second position in which the second antenna is connected to the first signal path; an amplifier arranged to amplify the uplink when the first switch is in its first position and the second switch is in its second position and to amplify the downlink when the first switch is in its second position and the second switch is in its first position; and a timing unit for controlling the first and second switches so as to align the first signal path and the second signal path to uplink and downlink transmission, respectively.

In another variation of the amplifying device of the invention, the amplifying device comprises: a first circulator having a first port for connection to the first antenna; a second circulator having a first port for connection to the second antenna; a first amplifier connected at its input to a second port of the first circulator and at its output to a third port of the second circulator; a second amplifier connected at its output to a third port of the first circulator and at its input to a second port of the second circulator.

Further features and advantages thereof will become clear upon reading the following detailed description and the accompanying drawings.

DETAILED DESCRIPTION OF EMBODIMENTS OF THE INVENTION

Figure 1:
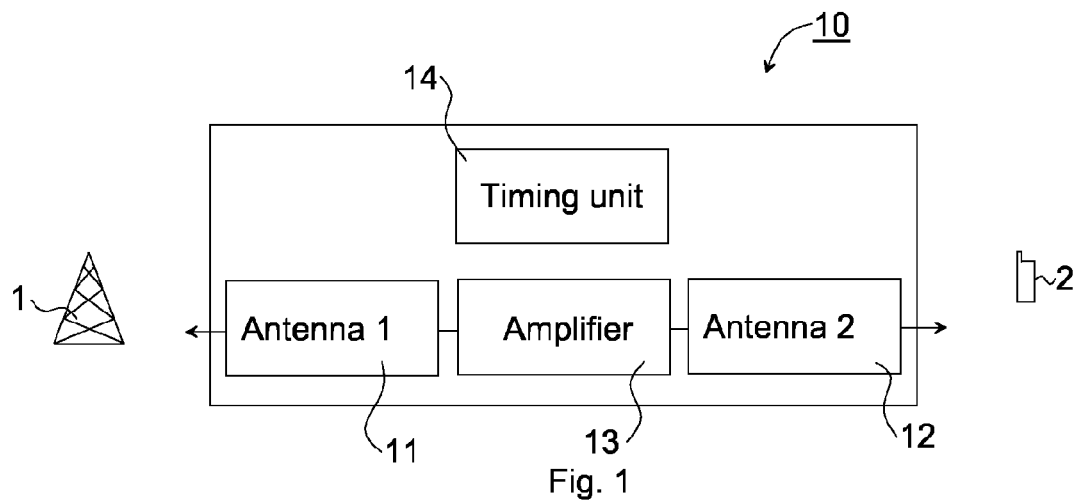
FIG. 1 illustrates a first embodiment of the repeater arrangement in accordance with the present invention.

Same reference numerals are used throughout the drawings for designating same or corresponding parts.

In TDD (Time Division Duplex) operation, basically, the same frequency is used for uplink (UL) and downlink (DL), or the frequency in UL and DL should at least be within a coherence bandwidth. UL and DL should thus be correlated and is considered as reciprocal communication channels. Coherence bandwidth may be defined as the range of frequencies over which the channel can be considered flat. That is, the frequency interval over which the UL frequency and the DL frequency of a signal are likely to experience comparable or correlated amplitude fading.

Briefly, the present invention provides a repeater arrangement designed to be reciprocal for DL and UL transmissions and does thus not destroy channel reciprocity. This can be achieved by means of different designs, as will be described in the following.

FIG. 1 illustrates the present invention in its most general embodiment. A repeater arrangement 10 in accordance with the invention comprises a first antenna 11 transmitting communication signals to an eNB 1 (evolved Node B), in the following denoted base station 1. The first antenna 11 also receives communication signals from the base station 1.

The repeater arrangement 10 also comprises a second antenna 12 transmitting communication signals to a user equipment 2, and receiving communication signals from the user equipment 2.

The repeater arrangement 10 further comprises an amplifier device 13 operatively connected to the first and second antennas 11, 12. A communication signal received at one antenna is input to the amplifier device 13, which amplifies and conveys the communication signal and outputs it to the other antenna. It is noted that the repeater arrangement 10 is a one-way repeater; that is, for any given moment in time one antenna is used for reception and the other for transmission.

In accordance with the invention, the signal path in UL and the signal path in DL within the repeater arrangement 10 are symmetrical. The signal path is the path within the repeater arrangement 10, from the first antenna 11 to the second antenna 12. The first signal path, comprising e.g. a conductor provides within the repeater arrangement 10 a signal path from the second antenna to the first antenna, i.e. provides the UL. The second signal path is correspondingly a signal path from the first antenna to the second antenna, i.e. provides the DL. In designing the repeater arrangement 10, it is noted that the UL and DL signal paths have the same electrical length, and designed in view of providing a path for the communication signal such that they have the same influence on the phase and amplitude for UL and DL. The signal paths should provide the same identical amplitude and phase characteristics to a signal. For example, a possible phase change should be the same for both UL and DL. Although difficult, the signal paths could be designed to preserve an absolute phase of the communication signal. The absolute phase of e.g. the uplink may be any arbitrary phase, as long as the reverse link, i.e. in this example the DL, has the same absolute phase. The first and second signal paths also have the same attenuation. True reciprocity is thereby obtained in the repeater arrangement 10. The signal paths are designed to provide identical phase and amplitude characteristics as function of frequency for both uplink and downlink. The signal paths are designed to give the same effects on the communication signal in both UL and DL.

In an embodiment, the repeater arrangement 10 further comprises a timing unit 14, for alignment to the UL/DL transmission periods in a similar manner as is done in the user equipment 2. In fact, in an embodiment the timing unit 14 comprises an existing chip-set also used by user equipment for decoding synchronization signals sent from the base station. The use of such timing unit 14 enables the repeater arrangement 14 to adapt to changes in for example sub-frame usage of LTE (Long Term Evolution) systems.

In another embodiment, the timing unit 24 comprises a stand-alone device having its own antenna 28 for determining when to switch between DL and UL. That is, the timing unit 24 may have antenna means 28 for enabling synchronization to the UL/DL transmissions. The timing unit 24 may thus tap the first antenna 11 or have its own antenna 28.

Figure 2:
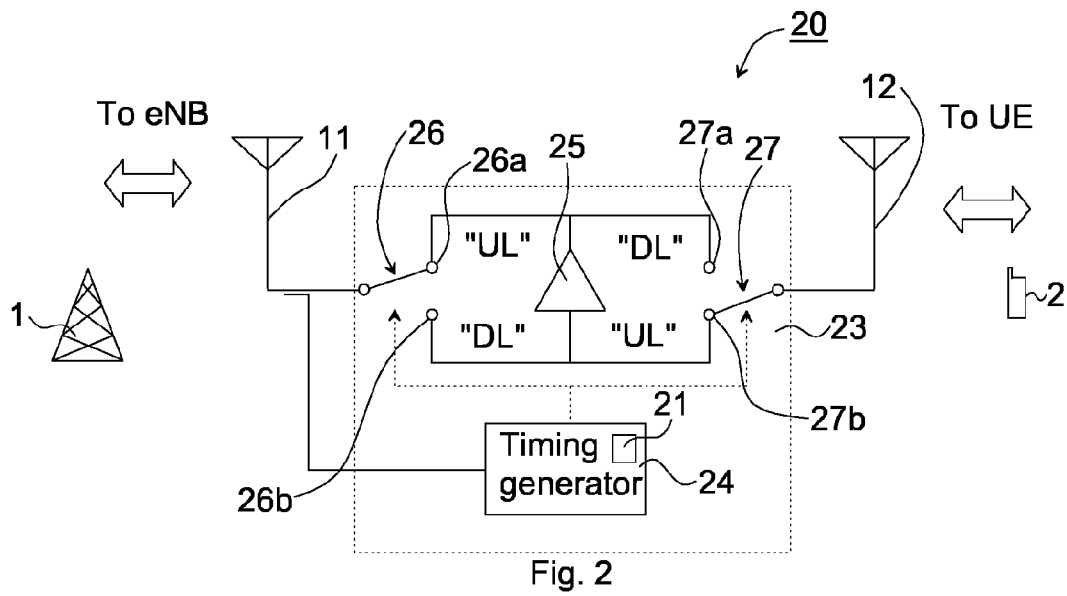
FIG. 2 illustrates a second embodiment of the repeater arrangement in accordance with the present invention.

FIG. 2 illustrates a second embodiment of the present invention. The repeater arrangement 20 comprises the first antenna 11 and the second antenna 12 as above. In this embodiment, an amplifying device 23 comprises switches 26, 27 that are selectively switchable for electrically connecting the first and second antennas 11, 12 to the first signal path and the second signal path, respectively.

In particular, the amplifying device 23 comprises a first switch 26 having a first position 26a and a second position 26b, and further a second switch 27 having a first position 27a and a second position 27b. When the first switch 26 is switched in its first position 26a and the second switch 27 is switched in its second position 27b, a signal path through the amplifying device 23 is provided for the UL. In particular, the communication signal received at the second antenna 12 is, with the switches in these positions, led through an amplifier 25 to the first antenna 11, the communication signal being amplified by the amplifier 25.

When the first switch 26 is in its second position 26b and the second switch 27 is in its first position 27a, then a signal path through the amplifying device 23 is provided for the DL. The communication signal is thus amplified in a corresponding manner as described above.

The amplifying device 23 further comprises a timing unit 24 for controlling the first and second switches 26, 27 so as to align the UL signal path, denoted first signal, and the DL signal path, denoted second signal path, for uplink and downlink transmission, respectively.

The timing unit 24 comprises, in an embodiment, a device for decoding a synchronization signal sent from the base station 1. The timing unit 24 may be arranged to listen to such synchronization signals transmitted from the base station 1.

When time synchronization is obtained, the amplifier 25 is switched on and the amplifier gain thereof is slowly ramped up in order to maintain reciprocity. That is, there should be no sudden changes of channel characteristics. Further, having this in mind, the signal strength should not be too high at the timing unit 24 and attenuators or other suitable means could be provided for limiting the signal strength if such need should occur.

It is noted that the timing unit 24 is a passive component, even if including attenuators, thereby preserving reciprocity. The timing unit 24 comprises in an embodiment a directional coupler "sniffing" a signal at antenna 11. That is, taking a physical sample of the transmit or receive signal from the main signal. A coupling level of the directional coupler is selected to be sufficiently low, resulting in an insignificant difference in UL and DL path gains, while still making it possible to regenerate the desired timing.

The amplifier 25 is thus arranged to be switched on once the timing unit 24 has timing synchronized the repeater arrangement 20 to uplink or downlink transmission, and the amplifier gain of the amplifier 25 is arranged to be ramped up so as to maintain reciprocity.

The power amplifier is a component in the repeater arrangement 20 that often is subject to phase and amplitude drift over time. However, in the present invention the amplifier does not need to be calibrated since the changes are much slower in time than the switching between UL and DL transmission. Other parts of the repeater arrangement 20, for example a distribution network, can be designed to be coherent without requiring calibration.

Figure 3:
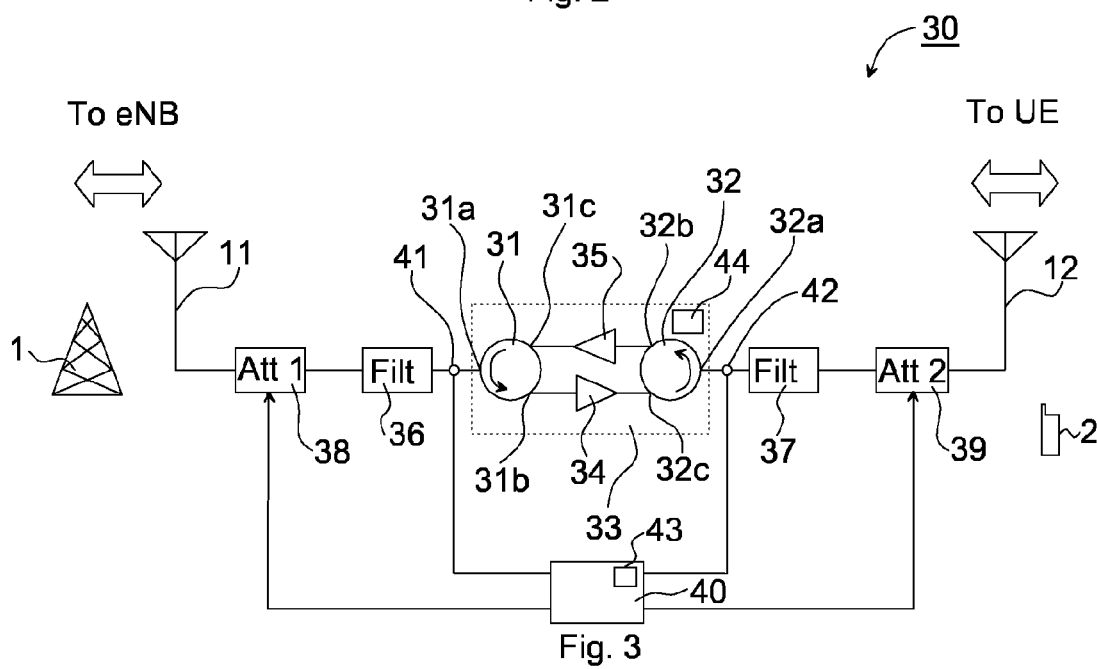
FIG. 3 illustrates a third embodiment of the repeater arrangement in accordance with the present invention.

FIG. 3 illustrates a third embodiment of the present invention. In this embodiment, the use of a timing unit is avoided, as is the use of switches.

The repeater arrangement 30 comprises the first antenna 11 and the second antenna 12 as above. An amplifying device 33 of this embodiment comprises a first circulator 31 and a second circulator 32, both circulators being three-port devices, each having a first, a second and a third port, 31a, 31b, 31c and 32a, 32b, 32c, respectively. The first circulator 31 has a first port 31a for connection to the first antenna 11, and a second circulator 32 has a first port 32a for connection to the second antenna 12.

The repeater arrangement 30 comprises a first amplifier 34 and a second amplifier 35, both operatively connected between the first and the second circulators 31, 32. In particular, the first amplifier 34 is connected at its input to the second port 31b of the first circulator 31 and at its output to the third port 32c of the second circulator 32. The second amplifier 35 is connected at its output to the third port 31c of the first circulator 31 and at its input to the second port 32b of the second circulator 32.

A DL communication signal received at the first antenna 11 is thus provided a signal path through the first port 31a of the first circulator 31, through the first amplifier 34, further on to the third port 32c of the second circulator 32 and output at the second antenna 12.

Similarly, a UL communication received at the second antenna 12 is provided a signal path through the first port 32a of the first circulator 32, through the second amplifier 35, further on to the third port 31a of the first circulator 31 and output at the first antenna 11.

The repeater arrangement 30 may further comprise adjustable attenuators for adjusting the gain when reflections are significant. In this way, high gain may be obtained without amplifier saturation. The reflection contribution from antenna ports will be equal in both UL and DL directions if the attenuators are equal, which guarantees the desired reciprocity. It is important that the reflection S11 at the antenna ports is equal at both antenna ports.

The repeater arrangement 30 may further comprise filtering means for removing undesired frequencies. For example, band pass filters may be needed to avoid amplifier saturation outside the antenna matched frequency band where S11 might be large.

In particular, a first filter device 36 may be provided operatively connected at one end to the first port 31a of the first circulator 31 and at another end to the first antenna 11. Further, a second filter device 37 may be provided operatively connected at one end to the first port 32a of the second circulator 32 and at another end to the second antenna 12.

Further, a first attenuator 38 may be provided operatively connected at one end to the first filter device 36 and at one end to the first antenna 11. Further, a second attenuator 39 may be provided connected at one end to the second filter device 37 and at one end to the second antenna 12. It is noted that the attenuators 38, 39 may be located in other ways. For example, the first attenuator 38 may be arranged between the first filter device 36 and the first circulator 31 instead.

The repeater arrangement 30 may further comprise a control unit 40 for controlling reflections at the antennas, and in particular for preventing undesired reflections at the antennas from saturating the amplifiers. In an embodiment, the control unit 40 is arranged to measure the signal strength, for example by first sensor 41 arranged between the first filter device 36 and the first circulator 31. The first sensor 41 is thus arranged to sense a signal power level between the first circulator 32 and the first filter 36. Similarly, a second sensor 42 may be arranged between the second filter device 37 and the second circulator 32. The second sensor 42 is thus arranged to sense a signal power level between the second circulator 32 and the second filter 37. The first sensor 41 is thereby arranged to sense a signal as reflected by the second antenna 12, and the second sensor 42 is thereby arranged to sense a signal as reflected by the first antenna 11. The purpose of the sensing of the signal power levels is to prevent the amplifiers from being saturated due to undesired reflections at both antennas, and the measured signal power level may be compared to a set threshold value.

The control unit 40 is connected to the first and second attenuators 38, 39, so as to be able to control the attenuators 38, 39. In particular, the control unit 40 comprises means 43, e.g. suitable software, for controlling the first and second attenuators 38, 39 in dependence on a signal level sensed by the first sensor 41 and the second sensor 42. The signal power level is compared to a threshold signal power level and appropriate action is taken in dependence on the comparison.

It is noted that the repeater arrangement 10, 20, 30 may comprise yet additional components that are conventionally used, but omitted herein, as not being important for the present invention.

In this embodiment of the repeater arrangement 30, the amplifying device 33 further comprises calibration means 44 for calibrating the first and second amplifiers 34, 35 to have equal gain and phase characteristics. Some feedback is expected due to reflection at the antenna port. The amplifier gain has to be adjusted in order to obtain appropriate repeater gain and in order to avoid amplifier saturation. For a narrowband repeater it is possible to adjust the feedback by appropriate phase matching. As mentioned, both amplifiers 34, 35 have to be calibrated to have equal gain and phase characteristics. This can be implemented for example by including calibration tables for use in compensating differences in e.g. amplitude. Digital compensation means can thus be used for compensating differences in UL and DL. With reflections, the overall gain an phase properties, including effects from undesired loops, shall be equal.

In an embodiment of the repeater arrangement 30, the amplifier 34, 35 that is not presently used is switched off (DTX, discontinuous transmission). A timing unit may identify the amplifier of the signal path that is not used for the moment. Upon such identification, the amplifier is then turned off. An advantage of this embodiment is that undesired feedback loop gains will diminish. Another advantage is lowered energy consumption.

The invention also encompasses an amplifying device 23, 33 suitable for use in the repeater arrangement 20, 30 as described above for amplifying a communication link between the base station 1 the and user equipment 2. The amplifying device 23, 33 is arranged for being operatively connected to the first antenna 11 and to the second antenna 12 thereby conveying communication signals between the first and second antennas 11, 12, providing a DL and a UL, respectively. The amplifying device 13, 23, 33 comprises a first signal path for the UL and a second signal path for the DL. The first and second signal paths have equal electrical length and affect the communication signal identically in both uplink and downlink, providing same phase and amplitude characteristics to the communication signal.

In an embodiment, the amplifying device 13, 23 comprises a first switch 26 having a first position 26a in which the first antenna 11 is connected to the first signal path and a second position 26b in which the first antenna 11 is connected to the second path. It further comprises a second switch 27 likewise having a first position 27a in which the second antenna 12 is connected to the second signal path and a second position 27b in which the second antenna 12 is connected to the first signal path. The amplifying device 13, 23 further comprises the amplifier 25, which is arranged to amplify the UL when the first switch 26 is in its first position 26a and the second switch 27 is in its second position 27b. The amplifying device is further arranged to amplify the DL when the first switch 26 is in its second position 26b and the second switch 27 is in its first position 27a. The amplifying device 13, 23 further comprises a timing device 24 for controlling the first and second switches 26, 27 so as to align the first signal path and the second signal path to UL and DL transmission, respectively.

In another embodiment, the amplifying device 33 comprises a first circulator 31 having a first port 31a for connection to the first antenna 11; a second circulator 32 having a first port 32a for connection to the second antenna 12; a first amplifier 34 connected at its input to a second port 31b of the first circulator 31 and at its output to a third port 32c of the second circulator 32; and a second amplifier 35 connected at its output to a third port 31c of the first circulator 31 and at its input to a second port 32b of the second circulator 32.

The repeater arrangement 10, 20, 30 as described above, using UL and DL within coherence bandwidth, may, for example, be used in wireless communication systems utilizing a time division duplex protocol.

The invention claimed is:

1. A repeater arrangement for amplifying a communication link between a base station and user equipment, said communication link comprising an uplink and a downlink utilizing frequencies within a coherence bandwidth, said repeater arrangement comprising:

a first antenna for communication with said base station;

a second antenna for communication with said user equipment;

an amplifying device operatively connected to said first antenna and to said second antenna for conveying and amplifying a communication signal between said first antenna and said second antenna, said amplifying device comprising a first signal path for said uplink and a second signal path for said downlink, said first and second signal paths having equal electrical length, wherein said first and second signal paths having equal electrical length in order to affects said communication signal identically in both uplink and downlink, providing same phase and amplitude characteristics to said communication signal;
   a first attenuator;
   a second attenuator;
   a control unit connected to said first and second attenuators, said control unit comprising electronic circuitry and at least one processor;
   a first circulator;
   a second circulator;
   a first filter is connected to the first attenuator and;
   a second filter is connected to the second attenuator;
   a first sensor for sensing a signal level between the first circulator and the first filter, wherein the first filter is connected at one end to the first circulator and at another end to the first antenna, wherein the first circulator is connected to the first antenna through a first port; and
   a second sensor for sensing a signal level between the second circulator and the second filter, wherein the second filter is connected at one end to the second circulator and at another end to the second antenna, wherein the second circulator is connected to the second antenna through a second port, wherein the control unit is configured to control said first and second attenuators in dependence on a signal level sensed by said first sensor or said second sensor.

2. The repeater arrangement as claimed in claim 1, wherein said amplifying device comprises:
a first switch having a first position in which said first antenna is connected to said first signal path and a second position in which said first antenna is connected to said second path;
a second switch having a first position in which said second antenna is connected to said second signal path and a second position in which said second antenna is connected to said first signal path;
an amplifier:
   arranged to amplify said uplink when said first switch is in its first position and said second switch is in its second position; and
   arranged to amplify said downlink when said first switch is in its second position and said second switch is in its first position; and
a timing unit for controlling said first and second switches so as to align said first signal path and said second signal path to uplink and downlink transmission, respectively.

3. The repeater arrangement as claimed in claim 2, wherein said timing unit comprises a device for decoding a synchronization signal sent from said base station.

4. The repeater arrangement as claimed in claim 2, wherein said amplifier is arranged to be switched on once said timing unit has timing synchronized said repeater arrangement to uplink and downlink transmission.

5. The repeater arrangement as claimed in claim 4, wherein amplifier gain of said amplifier is arranged to be ramped up so as to maintain reciprocity.

6. The repeater arrangement as claimed in claim 2, wherein said timing unit comprises a stand-alone unit and having an antenna for receiving synchronization signals from said base station.

7. The repeater arrangement as claimed in claim 1, wherein said amplifying device comprises:
a first amplifier connected at its input to a third port, which is a port of said first circulator, and at its output to a forth port, which is a port of said second circulator; and a second amplifier connected at its output to fifth port, which is a port said first circulator, and at its input to a sixth port, which is a port of said second circulator.

8. The repeater arrangement as claimed in claim 1, further comprising:
a first attenuator connected at one end to said first filter and at one end to said first antenna; and
a second attenuator connected at one end to said second filter and at one end to said second antenna.

9. The repeater arrangement as claimed in claim 7, said amplifying device further comprising a calibrator configured to calibrate said first and second amplifiers to have equal gain and phase characteristics.

10. The repeater arrangement as claimed in claim 1, wherein said uplink and said downlink utilize the same frequency.

11. The repeater arrangement as claimed in claim 1, wherein said communication is performed in accordance with a time division duplex protocol.

12. An amplifying device for operative connection to a first antenna and to a second antenna for conveying communication signals between said first antenna and said second antenna, said amplifying device amplifying a communication link between a base station and user equipment, said communication link comprising an uplink and a downlink utilizing frequencies within a coherence bandwidth, said amplifying device comprising:
   a first signal path for said uplink;
   a second signal path for said downlink, wherein said first and second signal paths have equal electrical length, wherein said equal electrical length affects said communication signal identically in both uplink and downlink, providing same phase and amplitude characteristics to said communication signal;
   a first attenuator;
   a second attenuator;
   a control unit connected to said first and second attenuators, said control unit comprising electronic circuitry and at least one processor;
   a first circulator;
   a second circulator;
   a first filter is connected to the first attenuator and;
   a second filter is connected to the second attenuator;
   a first sensor for sensing a signal level between the first circulator and the first filter, wherein the first filter is connected at one end to the first circulator and at another end to the first antenna, wherein the first circulator is connected to the first antenna through a first port;
   a second sensor for sensing a signal level between the second circulator and the second filter, wherein the second filter is connected at one end to the second circulator and at another end to the second antenna, wherein the second circulator is connected to the second antenna through a second port, wherein the control unit is configured to control said first and second attenuators in dependence on a signal level sensed by said first sensor or said second sensor.

13. The amplifying device as claimed in claim 12, wherein said amplifying device comprises:
a first switch having a first position in which said first antenna is connected to said first signal path and a second position in which said first antenna is connected to said second path;
a second switch having a first position in which said second antenna is connected to said second signal path and a second position in which said second antenna is connected to said first signal path;

a timing unit for controlling said first and second switches so as to align said first signal path and said second signal path to uplink and downlink transmission, respectively.

14. The amplifying device as claimed in claim 12, wherein said amplifying device comprises:

a first amplifier connected at its input to a third port, which is a port of said first circulator, and at its output to a forth port, which is a port of said second circulator; and a second amplifier connected at its output to a fifth port, which is a port of said first circulator, and at its input to a sixth port, which is a port of said second circulator.

* * * * *